United States Patent [19]

Niemiro et al.

[11] Patent Number: 5,154,269
[45] Date of Patent: Oct. 13, 1992

[54] CLUTCH MECHANISM FOR A PRINTING PRESS

[75] Inventors: Jozef W. Niemiro, Darien; Herbert L. Carlson, Chicago, both of Ill.

[73] Assignee: Rockwell International Corporation, El Segundo, Calif.

[21] Appl. No.: 734,849

[22] Filed: Jul. 24, 1991

[51] Int. Cl.⁵ .............................................. F16D 13/00
[52] U.S. Cl. ...................................... 192/67 P; 474/900; 403/1; 192/94
[58] Field of Search .............. 192/110 R, 110 S, 67, 192/67 P, 94; 403/1; 493/424–435; 474/201, 903, 900; 464/20, 37, 38

[56] References Cited

U.S. PATENT DOCUMENTS

| | | | |
|---|---|---|---|
| 232,926 | 10/1880 | Berkholz | 192/67 P |
| 3,434,577 | 3/1969 | Mathison | 192/67 R |
| 3,490,303 | 1/1970 | Rosenberg | 474/900 |
| 4,090,701 | 5/1978 | Von Hein | 493/427 |
| 4,265,350 | 5/1981 | Vaughan | 192/67 P |

*Primary Examiner*—Bruce M. Kisliuk
*Assistant Examiner*—Jack Lavinder
*Attorney, Agent, or Firm*—C. B. Patti; V. L. Sewell; H. F. Hamann

[57] ABSTRACT

A clutch mechanism for a printing press (10) having a shaft (14) having a cylindrical outer surface (36) adjacent one end (28) of the shaft (14). The mechanism has a device (15) for rotatably driving the shaft (14) and a drive member (32) having a cylindrical bore (34), with the one end (28) of the shaft (14) being received in the bore (34) of the drive member (32) such that the drive member (32) rotates on the shaft (14), with the drive member (32) having a clutch surface (30). The mechanism has a device (26) and (23) for coupling the shaft (14) with the clutch surface (30) of the drive member (32).

14 Claims, 3 Drawing Sheets

CLUTCH MECHANISM FOR A PRINTING PRESS

BACKGROUND OF THE INVENTION

The present invention relates to clutch mechanisms for a printing press.

In the past, printing presses have been used with a drive mechanism or shaft for a pair of folding rollers and a fly. However, the folding rollers and fly have required a particular timing relationship relative to the drive shaft for proper operation of the press. The timing is required with an initial use of the press, or when retiming is required during operation of the press. The previous devices utilized to obtain adjustable timing of the folding rollers and fly by the drive shaft were cumbersome and time consuming to obtain the necessary timing, and were subject to slippage which would require retiming of the press.

SUMMARY OF THE INVENTION

A principal feature of the present invention is the provision of an improved clutch mechanism for a printing press.

The clutch mechanism of the present invention comprises, an elongated shaft having an opening at one end of the shaft, and a generally cylindrical outer surface adjacent said one end of the shaft. The mechanism has means for rotatably driving the shaft, and a drive member having a circumferential inner bore, with the drive member being rotatably mounted on the one end of the shaft, with an inner surface of the bore facing the outer surface of the shaft, and with the drive member having a generally planar clutch surface. The mechanism also has a drive pulley secured to the drive member and extending peripherally around the drive member.

A feature of the present invention is the provision of a generally cylindrical clutch member having means for engaging the clutch surface of the drive member.

Another feature of the invention is that the clutch member has a plurality of spaced teeth engaging against the clutch surface of the drive member.

A feature of the invention is that the clutch member has a pin received in the drive shaft, such that the drive shaft drives the clutch member, and the clutch member drives the drive member.

Another feature of the invention is that the clutch member teeth engage the surface of the drive member in order to ensure against the possibility of slippage of the clutch member on the drive member.

Yet another feature of the invention is that the drive member driven by the shaft through the clutch member is of simplified construction and reduced cost.

A further feature of the invention is that the clutch member is secured to the end of the shaft by a threaded screw and the pin in a manner assuring against slippage of the clutch member relative to the shaft.

Another feature of the invention is that the clutch member is secured by the threaded screw and pin to the shaft in a simplified manner.

A further feature of the invention is that the screw facilitates adjustment of the drive member relative to the shaft in order to establish a desired timing with auxiliary equipment, such as for a pair of drive rollers and a fly of the press.

Yet another feature of the invention is that the timing relationship between the shaft and the auxiliary equipment may be readily modified during use of the press by merely loosening the screw and removing the pin from the drive shaft, and rotating the drive member to the desired timing relative to the auxiliary equipment, after which the clutch member is again secured to the shaft and engaged against the drive member through use of the screw and pin for the clutch member.

Thus, a feature of the present invention is that the auxiliary equipment of the press may be timed and retimed relative to the drive shaft in a simplified manner.

Still another feature of the invention is that the securement of the clutch member to the shaft and drive member minimizes the down time of the press.

Further features will become more fully apparent in the following description of the embodiments of this invention, and from the appended claims.

DESCRIPTION OF THE PREFERRED EMBODIMENTS

Figure 1:
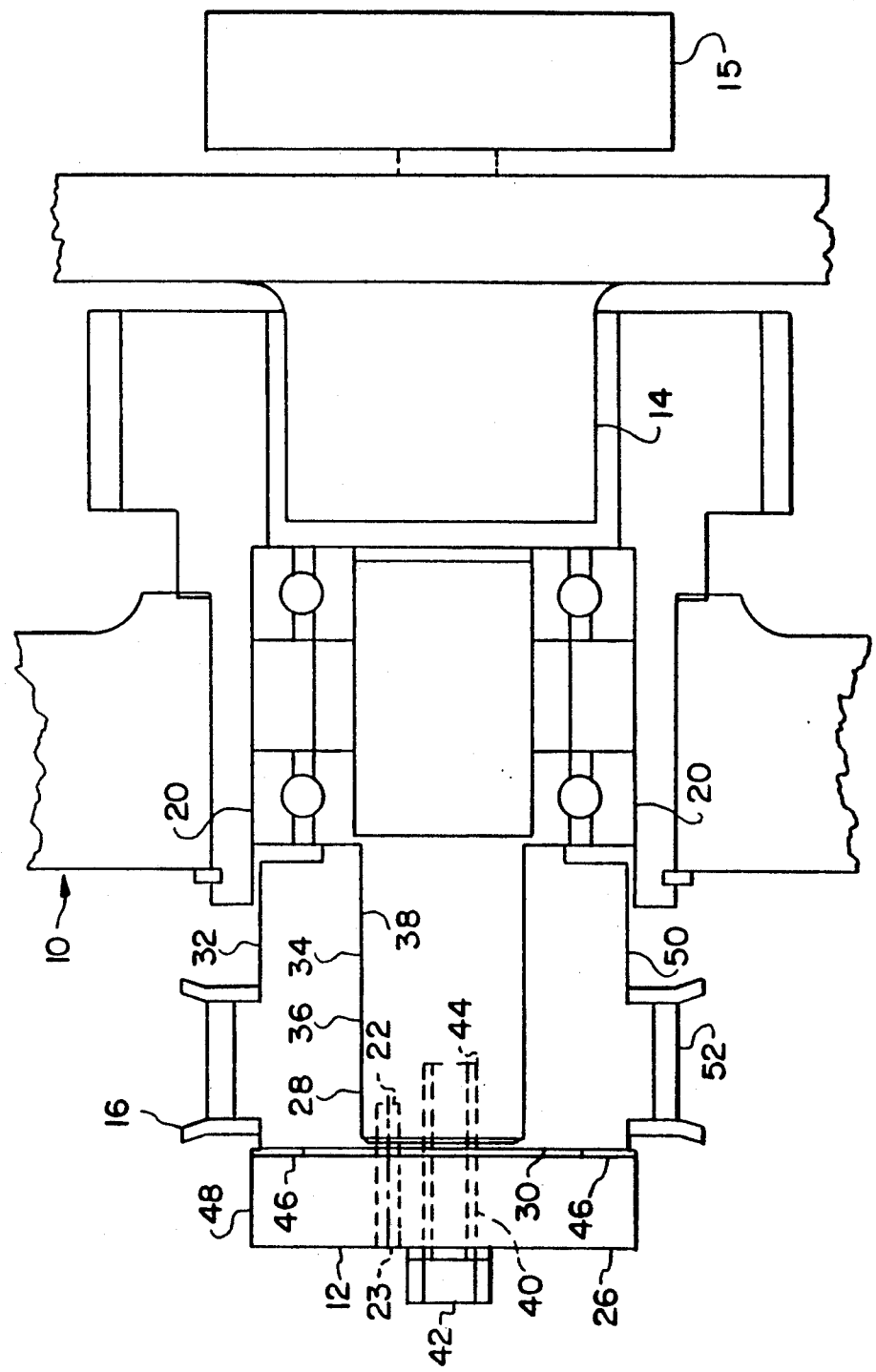
FIG. 1 is a plan view, taken partly in section, of a clutch mechanism for a printing press of the present invention.
Figure 3:
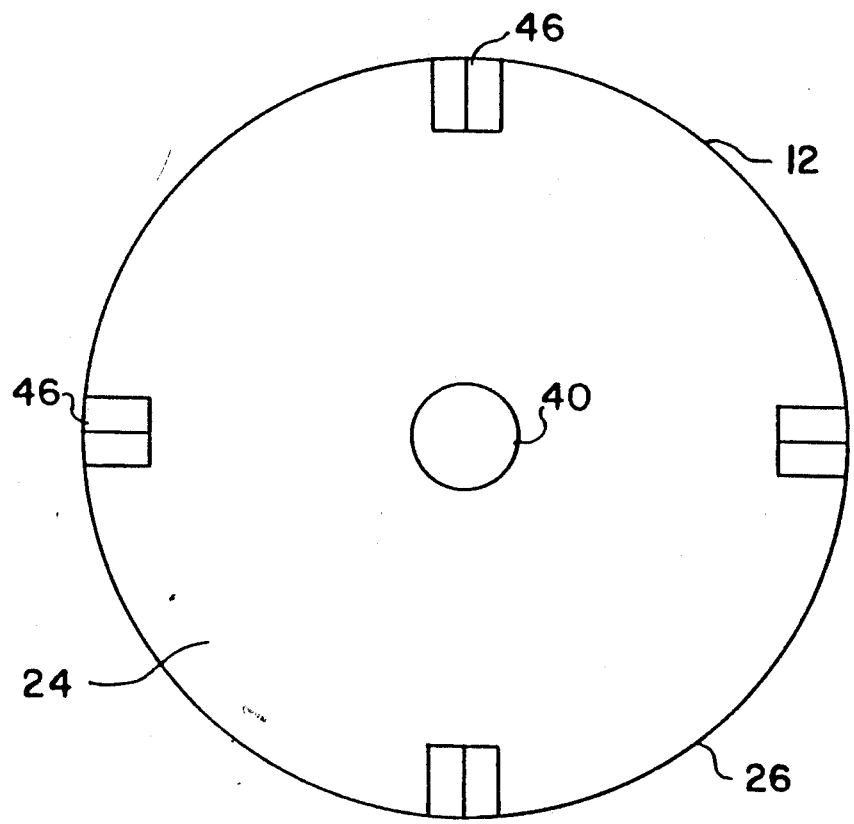
FIG. 3 is an end plan view of the clutch member of FIG. 2.
Figure 2:
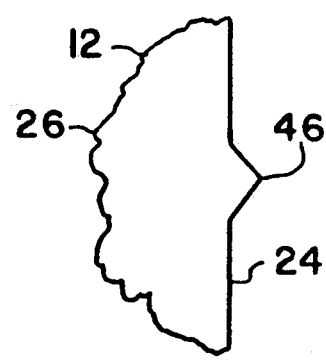
FIG. 2 is a fragmentary sectional view of a clutch member in the clutch mechanism of FIG. 1.

Referring now to FIGS. 1-3, there is shown a printing press generally designated 10 having a clutch mechanism or drive device 12 for coupling a drive shaft 14 with a rotatably mounted annular pulley 16. The shaft 14 is rotatably mounted in the press 10 by a plurality of bearings 20, and the press has a suitable motor 15 driving the shaft 14.

The drive shaft 14 has an opening 22 at one end 28 of the shaft 14 facing a clutch member 26, and receiving a pin 23 of the clutch member 26. The clutch member 26 has a plurality of peripheral teeth 46 which engage against a clutch surface 30 of a drive member 32. The drive member 32 has an inner cylindrical bore 34, and the shaft 14 has an outer generally cylindrical surface 36 adjacent the one end 28 of the shaft 14. As shown, the drive member 32 is received on the one end 28 of the shaft 14, with the outer cylindrical surface 36 of the drive shaft 14 facing an inner circumferential surface 38 of the drive member 32, such that the drive member 32 is rotatably mounted on the one end 28 of the drive shaft 14.

The clutch member 26 has a threaded bore 40 extending through the clutch member 26, and the press 10 has an elongated threaded screw or bolt 42 extending through the bore 40 and received in a threaded bore 44 at the one end 28 of the drive shaft 14, such that the screw 42 and pin 23 secure the clutch member 26 against the one end 28 of the shaft 14 with the pin 23 received in the opening 22 which drives the drive member 32 from the drive shaft 14 through the clutch member 26. As shown, the teeth 46 of the clutch member 26 are located on the surface 24 of the clutch member 26 adjacent an outer cylindrical surface 48 of the clutch member 26, with the teeth 46 of the clutch member 26 engaging against the clutch surface 30 of the drive member 32 in order to prevent slippage between the clutch member 26 and the drive member 32.

Thus, the drive member 32 is driven by the drive shaft 14 through the clutch member 26 which is secured by the screw 42 and pin 23 to the shaft 14 with the teeth 46 engaging against the drive member 32 in order to drive the drive member 32 from the drive shaft 14 without slippage by the clutch member 26 on the drive shaft 14 and drive member 32. In turn, the pulley 16 is secured to an outer surface 50 of the drive member 32 in order to rotate the pulley 16 responsive to rotation of the drive shaft 14 and driven drive member 32. Also, as will be seen below, an endless belt 52 is received on the pulley 16 in order to drive auxiliary equipment of the printing press 10.

Figure 4:
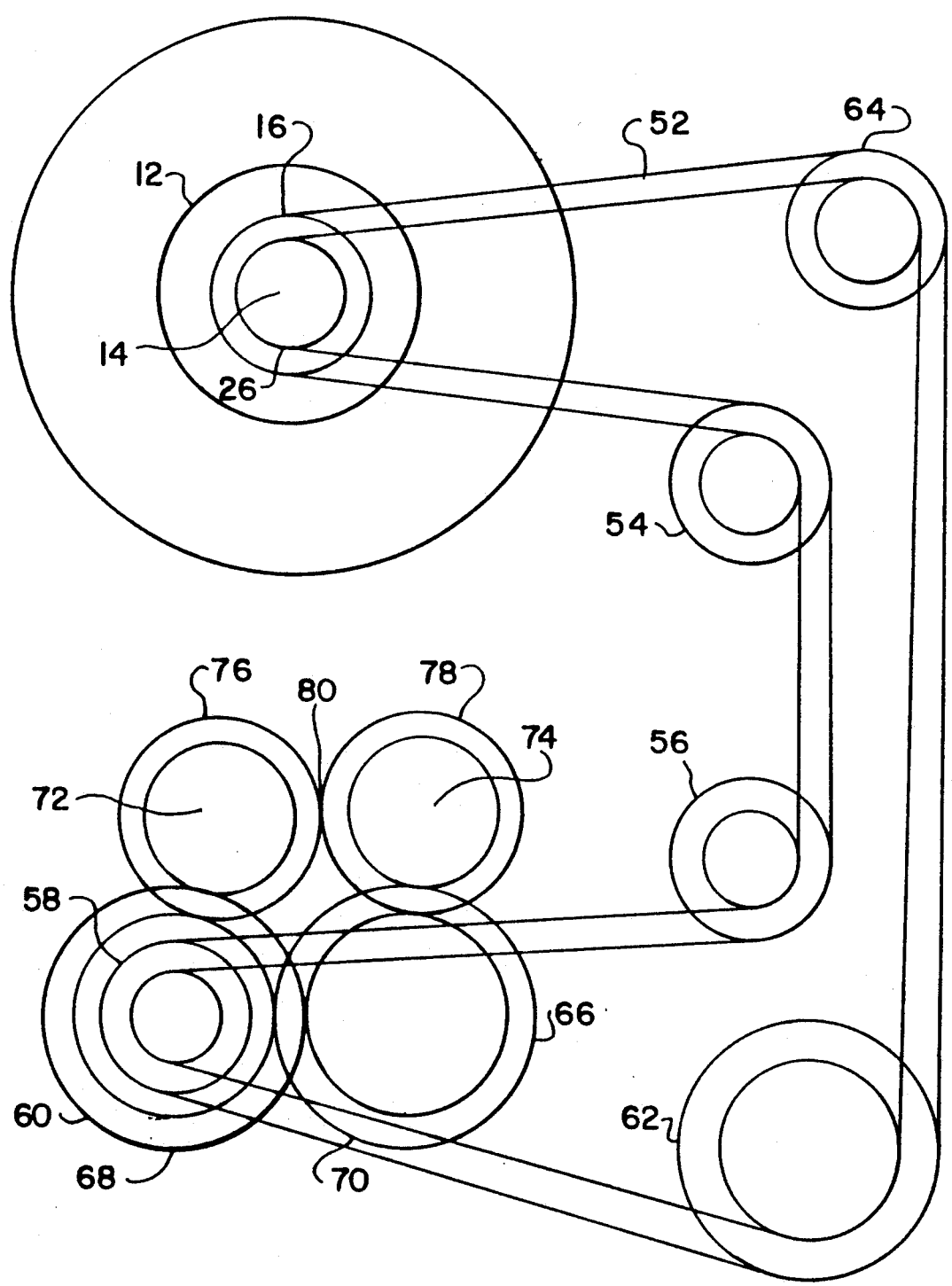
FIG. 4 is a diagrammatic view of the clutch mechanism in relationship to auxiliary equipment of the printing press.

Thus, with reference to FIG. 4, the belt 52 passes over the pulley 16, over a pair of first and second idler pulleys 54 and 56, around a pulley 58 secured to a suitable cylindrical gear 60, around a second pair of idler pulleys 62 and 64, and back to the first pulley 16 secured to the drive shaft 14. The printing press 10 has a second cylindrical gear 66 rotatably mounted in the press 10 adjacent the first gear 60 with outer teeth 68 of the first gear 60 meshing with outer teeth 70 of the second gear 66. The press 10 has a pair of folding rollers 72 and 74 rotatably mounted in the press 10 adjacent the gears 60 and 66, respectively. The folding roller 72 has a knurled surface 76 extending peripherally around the folding roller 72, and the folding roller 74 has a knurled surface 78 extending peripherally around the folding roller 74. The knurled surface of the folding roller 72 is meshed with the teeth 68 of the first gear 60, and the knurled surface 78 of the second roller 74 is meshed with the teeth 70 of the second gear 66, such that the first gear 60 drives the second gear 66, the first gear 60 drives the first folding roller 72, and the second gear 66 drives the second folding roller 74 in order that the folding rollers 72 and 74 cause folding of a sheet or document passing in the nip 80 between the folding rollers 72 and 74.

In use of the press 10, the folding rollers 72 and 74 both have cavities located peripherally around the folding rollers 72 and 74 which must be precisely timed relative to the drive shaft 14 driving the pulley 16 and belt 52 which in turn drive the folding rollers 72 and 74 through the first and second gears 60 and 66. In addition, a fly of the printing press 10 is also driven by the drive shaft 14 in a particular timed relationship to the drive shaft 14.

In accordance with the present invention, the clutch member 26 may be loosened in a simplified manner from the drive shaft 14 by merely loosening the screw 42 from the shaft 14, and removing the pin 23 from the opening 22. Next, the desired timing relationship between the drive member 32 and pulley 16 may be established relative to the folding rollers 72 and 74, after which the clutch member 26 is again secured to the drive shaft 14 through use of the screw 42 and pin 22 by placing the pin 23 in the opening 22 in a simplified and rapid manner. In this configuration, the clutch member 26 driven by the shaft 14 engages against the clutch surface 30 of the drive member 32, with the clutch member 26 being secured to the drive shaft 14 by the screw 42 and pin 23, such that slippage is prevented between the clutch member 26 and drive member 32. The drive shaft 14 then drives the folding rollers 72 and 74 through the pulley 16 and belt 52 in a timed relationship between the drive shaft 14 and folding rollers 72 and 74.

Thus, when it is initially desired to operate the press, the drive shaft 14 may be timed to the desired timing relative to the folding rollers 72 and 74 through the clutch member 26 by removing the screw 42 and pin 23, and the folding rollers 72 and 74 may be retimed relative to the shaft 14 at any desired time during the use of the press 10 through use of the screw 42 and pin 23 of the clutch member 26. In both configurations, the folding rollers 72 and 74 and drive shaft 14 may be timed and retimed in a rapid and simplified manner in order to facilitate this operation, and thus minimize down time of the press 10.

The foregoing detailed description is given for clearness of understanding, and no unnecessary limitations should be understood therefrom, as modifications will be obvious to those skilled in the art.

What is claimed is:

1. A clutch mechanism for a printing press, comprising:
   a shaft having a generally cylindrical outer surface adjacent one end of the shaft;
   means for rotatably driving the shaft;
   a drive member having a cylindrical bore, with the one end of the shaft being received in the bore of the drive member such that the drive member rotates on the shaft, with said drive member having a clutch surface;
   means for coupling the shaft and the clutch surface of the drive member, wherein the coupling means comprises a clutch member having means for releasable coupling the clutch member with the drive shaft, including means for securing the clutch member to the shaft, wherein the securing means comprises a screw through the clutch member into the shaft, and a pin received in a bore at the one end of the shaft.

2. The mechanism of claim 1 including a pulley secured to the drive member and extending peripherally around the drive member.

3. The mechanism of claim 2 including a drive belt received on said pulley.

4. The mechanism of claim 1 wherein the coupling means releasably couples the shaft and drive member.

5. The mechanism of claim 1 wherein the clutch surface of the drive member is generally planar.

6. The mechanism of claim 1 wherein the coupling means comprises a clutch member having means for releasably coupling the clutch member with the drive shaft.

7. The mechanism of claim 6 wherein the coupling means includes a pin extending from the clutch member and being received in a bore of the shaft adjacent the one end of the shaft.

8. The mechanism of claim 6 wherein the clutch member has at least one tooth engaging against the clutch surface of the drive member.

9. The mechanism of claim 6 including means for securing the clutch member to the shaft.

10. The mechanism of claim 1 wherein the clutch member has a generally cylindrical shape and having a generally central bore to receive the screw.

11. The mechanism of claim 10 wherein the screw extends into the shaft a greater distance than the pin.

12. A clutch mechanism for a printing press, comprising:
    a shaft having a generally cylindrical outer surface adjacent one end of the shaft;
    means for rotatably driving the shaft;
    a drive member having a cylindrical bore, with said drive member being rotatably mounted on the one end of the shaft, with an inner surface of the bore facing said outer surface of the shaft, and with the drive member having a generally planar clutch surface;

a drive pulley secured to the drive member and extending peripherally around the drive member;

a generally cylindrical clutch member having a plurality of spaced teeth engaging against said clutch surface of the drive member, with the clutch member having a generally central bore extending through the clutch member, and a pin extending outwardly from the clutch member; and means for securing the clutch member to the shaft through said bore of the clutch member, and with the pin received in a bore of the shaft.

13. The mechanism of claim 12 wherein the securing means includes a threaded screw extending through said bore of the clutch member into said shaft.

14. The mechanism of claim 12 including an endless drive belt received on said pulley.

* * * * *